April 26, 1949.　　　　N. MARCHAND　　　　2,468,093
ELECTRICAL ENERGY COMPARISON
SYSTEM AND METHOD
Filed July 3, 1945
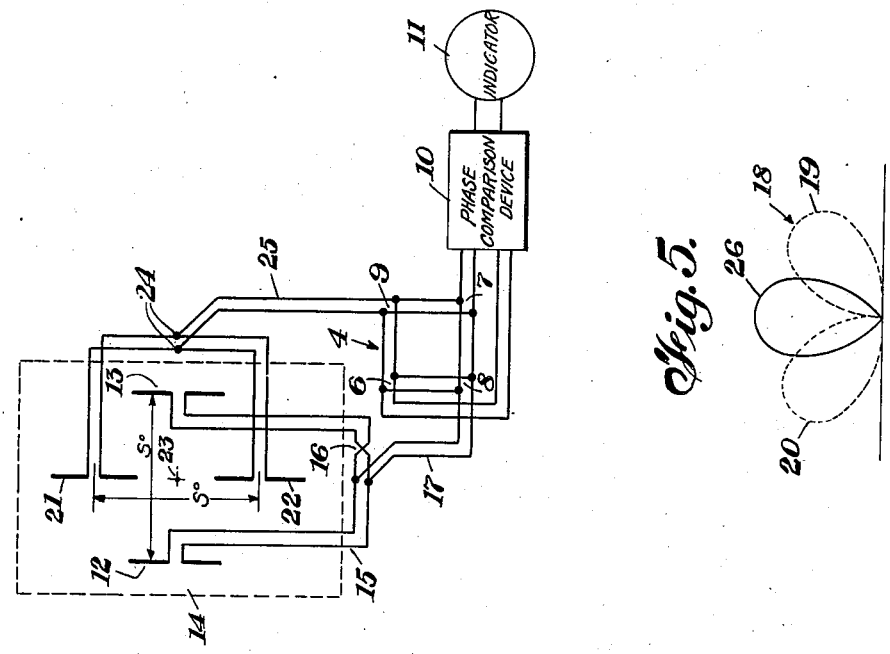
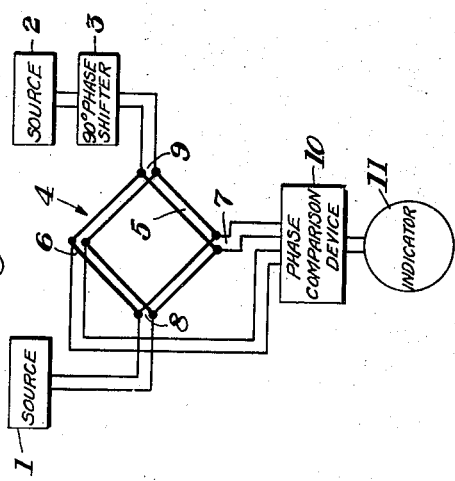
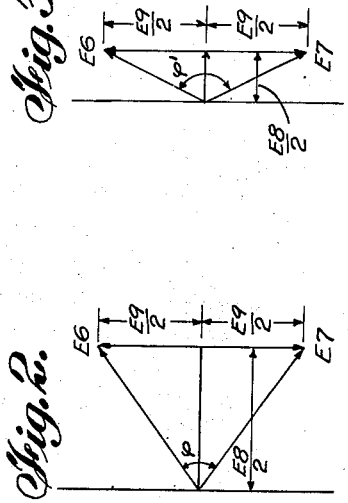
INVENTOR.
NATHAN MARCHAND
BY
ATTORNEY Patented Apr. 26, 1949

2,468,093

UNITED STATES PATENT OFFICE 2,468,093

ELECTRICAL ENERGY COMPARISON SYSTEM AND METHOD

Nathan Marchand, New York, N. Y., assignor to Federal Telephone and Radio Corporation, New York, N. Y., a corporation of Delaware Application July 3, 1945, Serial No. 602,952

7 Claims. (Cl. 343—119)

1

The present invention relates to electrical energy systems and methods.

For certain purposes the direct comparison or direct measurement of the relative amplitude of different electrical energies is difficult accurately to make and undesirable.

An object of the present invention is the provision of a method and means for indirectly comparing the relative amplitudes of separate electrical energies. In accordance with an aspect of my invention, I accomplish this by translating the differences in amplitude into corresponding differences in phase and comparing the differences of phase.

It is a further object of my invention to provide a translation circuit that will translate differences in amplitude of energy of the same frequency into differences of phase.

In certain direction finders, there may be derived from the antenna system, two voltages approximately 90° out of phase, the relative amplitudes of which when compared will indicate the direction from which a signal is being received.

Another object of the present invention is the provision, in a direction finder of the type described, of means and a method for comparing the amplitude of two voltages approximately 90° out of phase. In accordance with an aspect of my invention, this is accomplished by translating the difference of amplitude between said voltages into a difference of phase and measuring the difference of phase.

Other and further objects of the present invention will become apparent and my invention will be best understood from the following description of embodiments thereof, reference being had to the drawings, in which:

Fig. 1 is a schematic and block diagram of an electrical system embodying my invention;

Figs. 2 and 3 are vector diagrams used in describing my invention;

Fig. 4 is a schematic and block diagram of a direction finder embodying my invention; and Fig. 5 is a polar diagram of the radiant reception pattern, of the antenna system of Fig. 4.

Referring now to Fig. 1, energies from two sources of energy 1 and 2 are to be compared to determine the relative amplitude. This comparison is not made directly but, in accordance

2 with my invention, is accomplished by translating the difference between the amplitudes of these energies into corresponding differences in phase and then comparing the different phases. This translation of differences of amplitude into differences of phase is accomplished in a transmission line bridge or network 4, which may be of any suitable type, such as for example described in Patent No. 2,147,809, granted to Andrew Alford, February 21, 1939. In making this translation from amplitude differences to corresponding phase differences, however, the energy from the two sources must be 90° out of phase and if sources 1 and 2 are in phase, this phase variation is accomplished by means of a phase shifter 3 in series with one of said sources, for example, source 2.

The transmission line bridge 4 illustrated is in the form of a closed loop of dual transmission line provided with a transposition as indicated in arm 5 of the bridge, and having two pairs of opposite terminals 6 and 7, and 8 and 9, one pair 6 and 7 being at right angles to the other pair 8 and 9. Each terminal consists of connections to each conductor of the dual transmission line. Source 1 is connected to terminal 8, while the output of the 90° phase shifter 3 is connected to terminal 9. The voltages applied to terminal 8 will be divided equally and appear at terminals 6 and 7. Likewise the voltages applied to terminal 9 will be divided equally and will appear at terminals 6 and 7. Thus at one of the terminals 6 and 7, the voltages derived from terminals 8 and 9 will add and at the other one of the terminals 6 and 7, the voltages derived from terminals 8 and 9 will subtract, due to the transposition. This will be better understood in connection with the vector diagrams of Figs. 2 and 3.

Let the voltages at terminals 6, 7, 8, and 9 be designated by the symbols $E_6$, $E_7$, $E_8$ and $E_9$ respectively. Assuming for the vector diagram of Fig. 2 that the voltages $E_8$ and $E_9$ are equal, and that at terminal 6 a half of $E_8$ and a half of $E_9$ add, while at terminals 7, a half of $E_8$ plus a half of $E_9$ subtract, the following results will be obtained, reference being had to Fig. 2.

At terminals $E_6$, one-half of the voltage $E_8$ will be added to one-half of the voltage $E_9$, which latter voltage is 90° out of phase with the former. Consequently the resultant voltage $E_6$ will be obtained at terminal 6. At terminal 7, one-half the voltage $E_8$ is combined with half the voltage $E_9$, but since the voltage $E_9$ is transposed or shifted 180°, the resultant voltage appearing at terminal 7 will be as illustrated by the vector $E_7$ in Fig. 2. Voltage $E_6$ is equal to voltage $E_7$ but is out of phase with it. The phase relation between the voltages at terminals 6 and 7, is indicated by the angle $\varphi$ in Fig. 2 and will be 90° when the voltages $E_8$ and $E_9$ are equal and the bridge is perfectly symmetrical. Assuming, however, as in the vector diagram of Fig. 3 that the amplitude of the voltages applied to terminals 8 is less than that applied to terminal 9, the angle $\varphi$ will change and as can be seen from Fig. 3 a phase angle $\varphi'$ will be obtained between the voltages at terminals 6 and 7, which is larger than 90°. Likewise it can be shown that if the voltage at terminal 9 is less than the voltage at terminal 8, a smaller phase angle less than 90°, will be obtained between the voltages at terminals 6 and 7. It will therefore be seen that the phase angle of the voltages appearing at terminals 6 and 7 will vary in accordance with the difference in amplitude between the voltages applied to terminals 8 and 9.

If when the resultant phase of the voltages at terminals 6 and 7 are compared as in any suitable phase comparison device 10 and the difference of said phase is read on a suitably calibrated indicator 11, the difference in amplitude between the voltages derived from source 1 and those derived from source 2 is thus readily determined.

Of course it will be understood that if sources 1 and 2 are 90° out of phase with each other, the phase shifter 3 becomes unnecessary. Ordinarily where the amplitude of energy from two sources 90° out of phase is to be compared, various difficulties are presented. This situation is very readily handled in accordance with the method and means hereinbefore described. An example of this is illustrated in the direction finder system of Fig. 4.

Referring now to Fig. 4, a pair of vertical dipoles 12 and 13 are arranged in front of a reflector 14 and spaced apart a distance S° which is preferably small in respect to a wavelength, for example, 45° or less. Dipoles 12 and 13 are cross-connected by a transmission line 15 having a transposition 16 and a transmission line 17 is connected to the midpoint of line 15, the transmission line 17 being connected to terminal 8 of transmission line bridge 4. Dipoles 12 and 13 are arranged a horizontal distance apart S°. They produce a radiant reception pattern as indicated in dotted lines in Fig. 5 and designated by the numeral 18. This pattern has a null for energy being received in a plane normal to the common plane of dipoles 12 and 13. The pattern 18 has two lobes 19 and 20 which are 180° out of phase with each other in terms of the voltages delivered to transmission line 17.

Another pair of similar vertical dipoles 21 and 22 is also mounted in front of the reflector 14, the dipoles 21 and 22 being spaced apart a distance S° the same as the distance S° separating dipoles 12 and 13. The dipoles 21 and 22 are vertically spaced from each other and dipoles 21 and 22 extend in a line which is half-way between dipoles 12 and 13 so that dipoles 12, 13, 21 and 22 are all equi-distant from a central point 23 and symmetrically disposed about said point with dipoles 12 and 13 spaced horizontally and dipoles 21 and 22 spaced vertically. Accordingly, it will be seen that the dipole arrangement is symmetrical. Dipoles 21 and 22 are connected together by a transmission line 24, which, however, has no cross-over. The midpoint of line 24 is connected by a transmission line 25 to terminal 9 of the bridge 4.

Dipoles 21 and 22 have a radiant reception pattern as indicated in Fig. 5 and designated by the numeral 26. Energy received according to pattern 26 by dipoles 21 and 22 and applied to terminals 9, will be 90° out of phase with energy derived from dipoles 12 and 13 and applied to terminal 8. Accordingly, it will be seen that the voltages applied to terminals 8 and 9 are 90° out of phase which is the situation described in connection with the system of Fig. 1. Accordingly it will be readily apparent that as the amplitude of the voltages applied to terminals 8 and 9 vary, the phase of the voltages appearing at terminals 6 and 7 will correspondingly vary. Since there are two different directive patterns 26 and 18, said amplitudes will vary in accordance with the patterns as the direction from which energy is being received varies. Accordingly, when the resultant phase differences or phase variations are compared in any suitable phase comparison device, 10, and indicated in any suitable indicator 11, the direction from which energy is being received will then be indicated, upon suitable calibration of indicator 11.

Any suitable phase comparison device and indicator may be employed such as for example is described in my co-pending application, N. Marchand–11, for "Phase control device," Serial No. 584,555, filed March 24, 1945 or those described in my joint co-pending application N. Marchand–M. Semel 12–1 for "Phase comparison systems," Serial No. 578,741, filed February 19, 1945.

It will be recognized that the aforedescribed antenna array is symmetrical. Looking into transmission line 15 from dipole 12, not only is the impedance at the point at which transmission line 17 is connected to transmission line 15 seen, but also the impedance of dipole 13. A similar relationship holds looking into dipole 13. Likewise looking into transmission line 24 from dipole 21, not only is the impedance of the point at which transmission line 25 is coupled to transmission line 24 seen, but also the impedance of dipole 22. A similar relationship holds looking into pole 22. Accordingly, it will be seen that the impedances are balanced and symmetrical in the system and this aids in producing accurate direction findings and a balanced system.

Considering the voltage applied to terminal 8

$$E_8 = jE \sin\left(\frac{S°}{2} \sin \theta\right)$$

where

E=1.4 times the voltage received at each antenna connected to the terminal in question  (1)
$\theta$=the angular direction of reception from the normal plane.

Antennas 21 and 22 are connected together with the same length of transmission line as that which connects 12 and 13 except that there is no crossover in it so that the voltage at terminal 9 is $E_9$ where $$E_9 = E \qquad (2)$$

Now, if the voltage at terminal 8 is split into two parts and also the voltage at terminal 9 is split into two parts, they are so added that two voltages are obtained, namely $$.5E_8 + .5E_9, \text{ and } -.5E_8 + .5E_9$$

Two voltages will be obtained $E_6$ and $E_7$ where $$E_6 = .5E + j.5E \sin\left(\frac{S°}{2} \sin\theta\right) \quad (3)$$

$$E_6 = 0.5\sqrt{E^2 + \left[E \sin\left(\frac{S°}{2}\sin\theta\right)\right]^2} / \tan^{-1} \sin\left(\frac{S°}{2}\sin\theta\right)$$

$$E_7 = .5E - j.5E \sin\left(\frac{S°}{2}\sin\theta\right) \quad (4)$$

$$E_7 = 0.5\sqrt{E^2 + \left[E\sin\left(\frac{S°}{2}\sin\theta\right)\right]^2} / \tan^{-1}\left(-\sin\left(\frac{S°}{2}\sin\theta\right)\right)$$

The phase angle $\phi$ between $E_6$ and $E_7$ is $$\phi = 2\tan^{-1}\left[\sin\left(S\frac{°}{2}\sin\theta\right)\right]$$

While I have described the specific details of two embodiments of my invention, it will be apparent to those versed in the art that changes may be made in certain details without departing from the teachings of my invention. For example, while I have described the voltages applied to terminals 8 and 9 as being 90° out-of-phase, it will be apparent that this phase relationship may be varied to a certain extent and in many instances no harm will result therefrom. Furthermore, while I have described the use of my invention in connection with one type of antenna system, it will be apparent to those versed in the art that it may be employed with many types of antenna systems and many types of direction finders. Accordingly, while I have described above the principles of my invention in connection with specific apparatus, and particular modifications thereof, it is to be clearly understood that this description is made only by way of example and not as a limitation on the scope of my invention as defined in the accompanying claims.

I claim:

1. A system for translating the relative amplitude of energy derived from two sources whose outputs are 90° out of phase with each other into differences in phase comprising a transmission line bridge having two pairs of opposite terminals and means effectively producing an 180° relative phase shift in one arm of said bridge, means separately coupling said sources to the terminals of one of said pairs and output means coupled to each of the other terminals of the other of said pairs.

2. A system for comparing the relative amplitude of energy derived from two sources whose outputs are 90° out of phase with each other comprising a transmission line bridge having two pairs of opposite terminals and means effectively producing an 180° relative phase shift in one arm of said bridge, means separately coupling said sources to the terminals of one of said pairs, and phase comparison means coupled to the terminals of the other of said pairs.

3. A system for comparing the relative amplitude of energy derived from two sources whose outputs are in phase comprising means for shifting the phase of energy from one of said sources approximately 90° with respect to the other, a transmission line bridge having two pairs of opposite terminals and means for effectively producing an 180° phase shift in said bridge, means separately coupling the energy derived from said two sources which have been shifted approximately 90° in relationship to each other to the terminals of one of said pairs, and phase comparison means coupled to the terminals of the other of said pairs.

4. A method of comparing the relative amplitudes of separate electrical energy 90° out of phase by the use of a transmission line bridge having two pairs of opposite terminals and means producing a 180° phase shift in one arm of said bridge, comprising applying the energies to be compared separately to the opposite terminals of one of said pairs, and comparing the phases between the energy appearing at the opposite terminals of the other of said pairs.

5. A direction finder comprising an antenna system having two different directive patterns, the energy received according to one pattern being 90° out of phase with the energy received according to the other pattern, a transmission line bridge having two pairs of opposite terminals and means for effectively producing an 180° phase shift in one of the arms of said bridge, means coupling the energy derived according to one of said patterns to one terminal of one of said pairs, means coupling the energy derived according to the other of said patterns to the opposite terminal of said one of said pairs, a phase-comparison device associated with an indicator, and means coupling the other pair of terminals to said phase-comparison device.

6. A direction finder according to claim 5 wherein the antenna system comprises two pair of spaced vertical dipoles, a first pair being horizontally spaced from each other a given distance and the second pair being vertically spaced from each other an equal distance, all of said dipoles being symmetrically disposed about a central point and equi-distant therefrom, a first transmission line interconnecting said first pair of dipoles and having a cross-over therein, a second transmission line interconnecting said second pair of dipoles, the output from each of said transmission lines being taken off at the midpoint thereof.

7. A direction finder according to claim 5 wherein the antenna system comprises two pair of spaced vertical dipoles, a first pair being horizontally spaced from each other a given distance and the second pair being vertically spaced from each other an equal distance, all of said dipoles being symmetrically disposed about a central point and equi-distant therefrom, a first transmission line interconnecting said first pair of dipoles and having a cross-over therein, a second transmission line interconnecting said second pair of dipoles, the output from each of said transmission lines being taken off at the midpoint thereof and further including a planar reflector in front of which all of said dipoles are mounted.

NATHAN MARCHAND.

REFERENCES CITED

The following references are of record in the file of this patent:

UNITED STATES PATENTS

| Number | Name | Date |
| --- | --- | --- |
| 961,265 | Stone | June 14, 1910 |
| 1,839,290 | Bailey | Jan. 5, 1932 |
| 2,408,395 | Hays, Jr. | Oct. 1, 1946 |
| 2,405,073 | Troell | July 30, 1946 |